United States Patent
Carlsson

(10) Patent No.: US 8,238,361 B2
(45) Date of Patent: Aug. 7, 2012

(54) SCHEDULING AND QUEUE MANAGEMENT WITH ADAPTIVE QUEUE LATENCY

(75) Inventor: Roland Carlsson, Öjersjö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 250 days.

(21) Appl. No.: 12/520,021

(22) PCT Filed: Dec. 18, 2006

(86) PCT No.: PCT/SE2006/050586
§ 371 (c)(1),
(2), (4) Date: Jul. 1, 2009

(87) PCT Pub. No.: WO2008/076017
PCT Pub. Date: Jun. 26, 2008

(65) Prior Publication Data
US 2010/0158032 A1 Jun. 24, 2010

(51) Int. Cl.
*H04L 12/54* (2006.01)
*H04L 12/28* (2006.01)
*G01R 31/08* (2006.01)
(52) U.S. Cl. .................. 370/429; 370/412; 370/232
(58) Field of Classification Search .................. None
See application file for complete search history.

(56) References Cited

U.S. PATENT DOCUMENTS

| | | | | |
|---|---|---|---|---|
| 5,629,937 | A * | 5/1997 | Hayter et al. | 370/233 |
| 7,065,581 | B2 * | 6/2006 | Dierks et al. | 709/232 |
| 7,272,111 | B2 * | 9/2007 | Zukerman et al. | 370/230 |
| 7,453,801 | B2 * | 11/2008 | Taneja et al. | 370/230 |
| 7,571,247 | B2 * | 8/2009 | Banerjee et al. | 709/232 |
| 7,596,086 | B2 * | 9/2009 | Wang et al. | 370/230 |
| 7,720,085 | B1 * | 5/2010 | Okholm et al. | 370/429 |
| 2003/0088690 | A1 * | 5/2003 | Zuckerman et al. | 709/232 |
| 2004/0213264 | A1 * | 10/2004 | Mistry et al. | 370/395.7 |
| 2005/0226249 | A1 * | 10/2005 | Moore | 370/395.21 |
| 2006/0104313 | A1 * | 5/2006 | Haner et al. | 370/517 |

* cited by examiner

*Primary Examiner* — Gary Mui
*Assistant Examiner* — Hicham Foud

(57) ABSTRACT

The invention relates to a scheduler for a TCP/IP based data communication system and a method for the scheduler. The communication system comprises a TCP/IP transmitter and a receiving unit (UE). The scheduler is associated with a Node comprising a rate measuring device for measuring a TCP/IP data rate from the TCP/IP transmitter and a queue buffer device for buffering data segments from the TCP/IP transmitter. The scheduler is arranged to receive information from the rate measuring device regarding the TCP/IP data rate and is arranged to adapt the permitted queue latency to a minimum value when the TCP/IP transmitter is in a slow start mode and to increase the permitted queue latency when the TCP/IP rate has reached a threshold value.

20 Claims, 6 Drawing Sheets

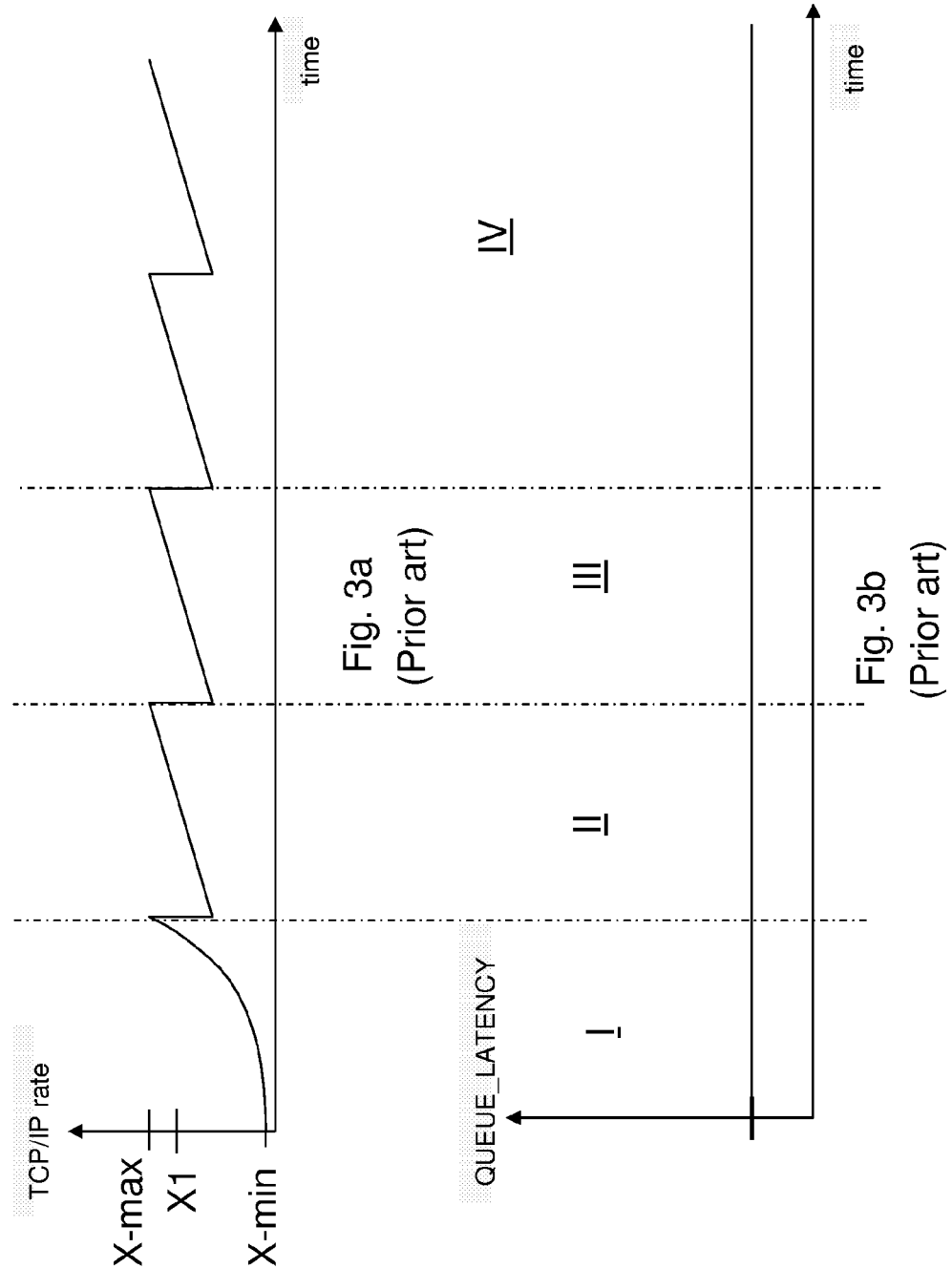

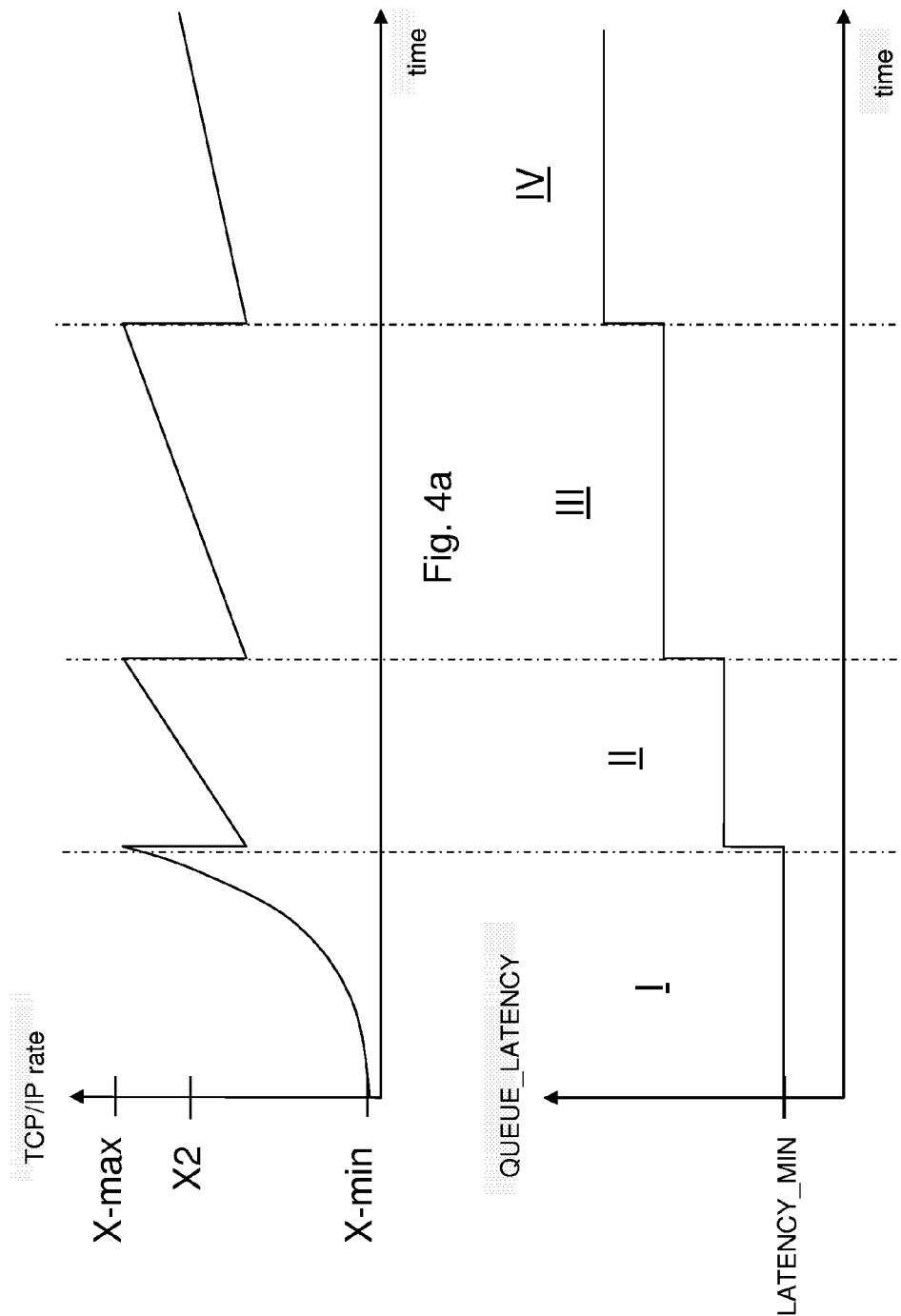

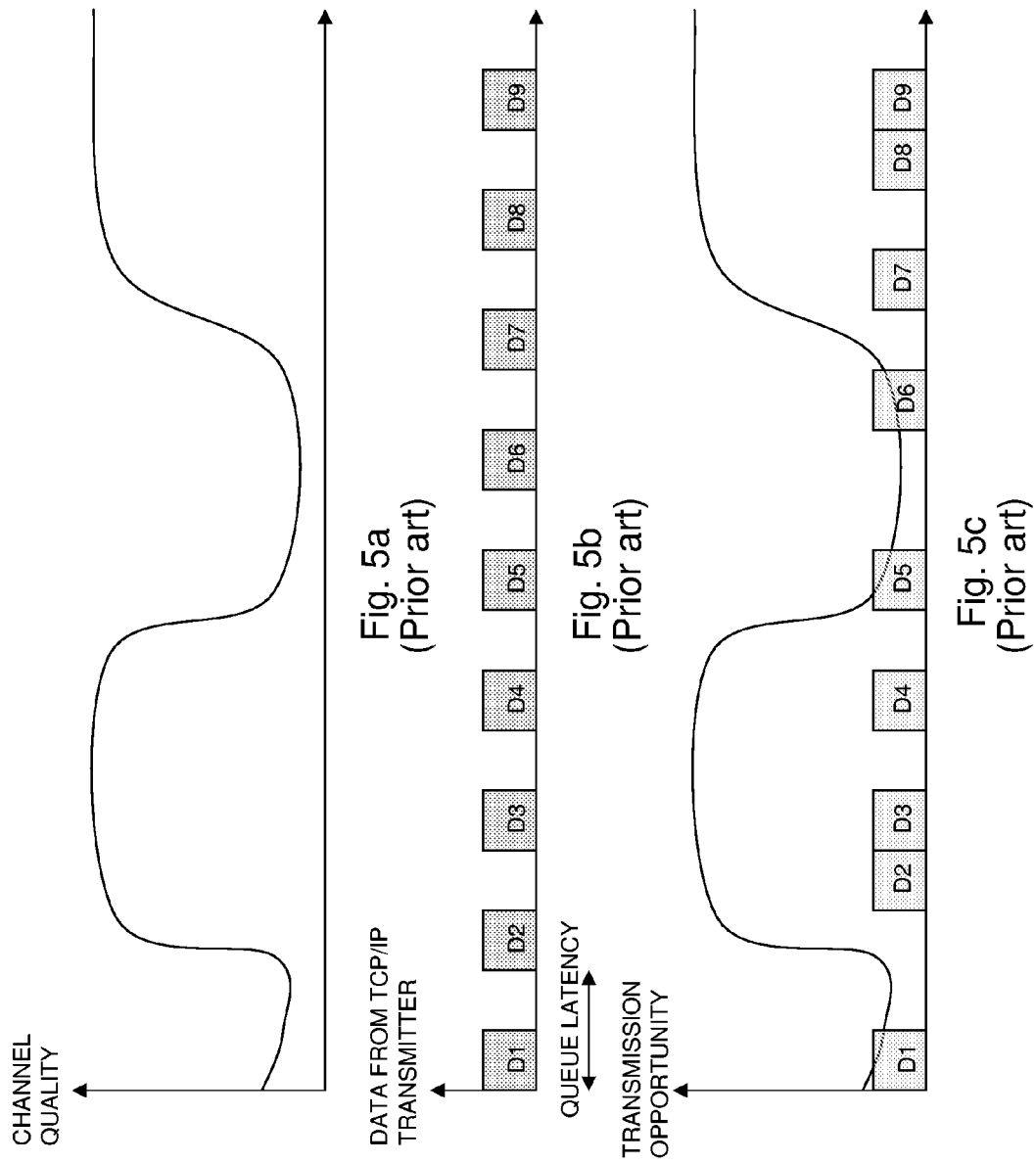

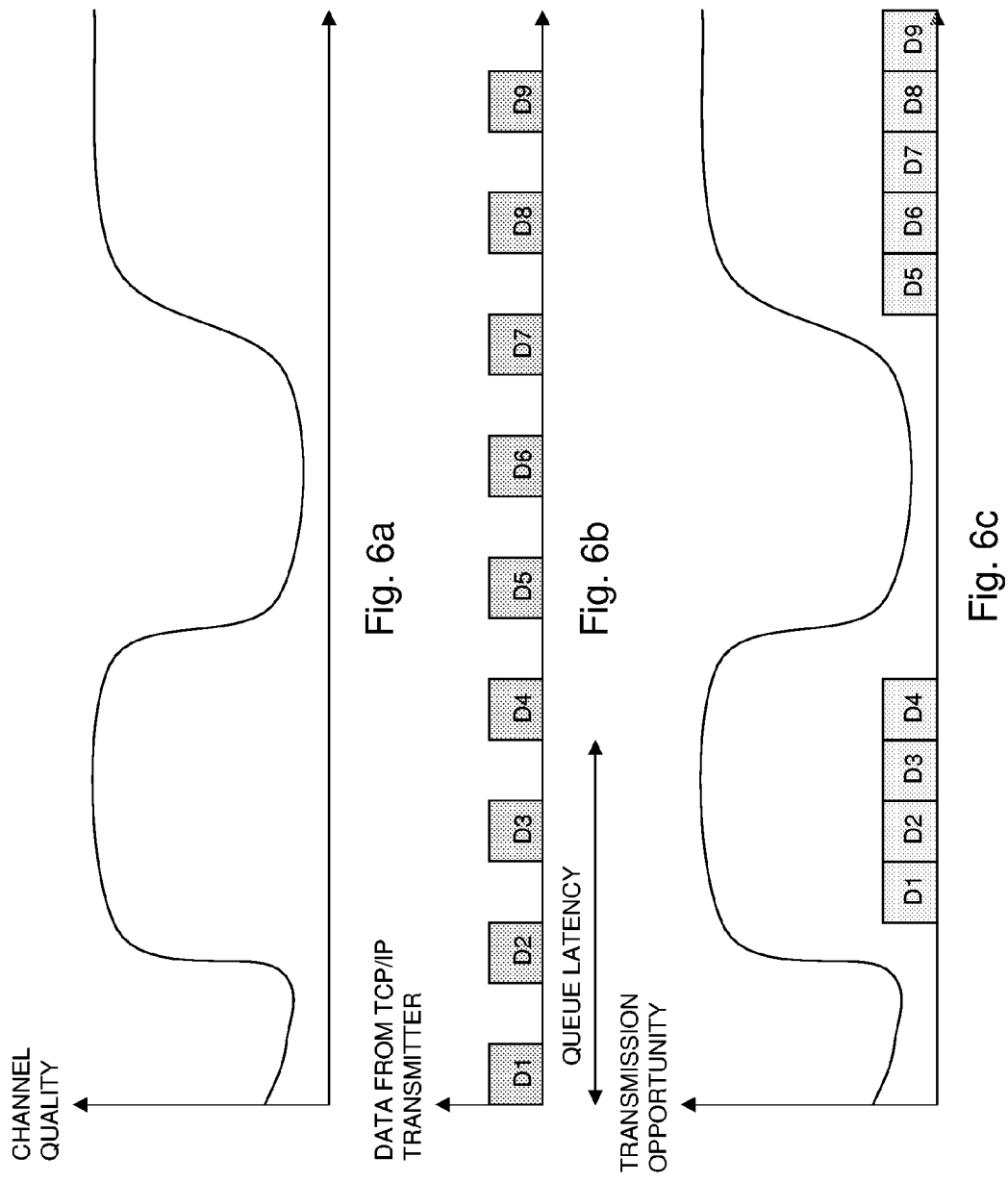

SCHEDULING AND QUEUE MANAGEMENT WITH ADAPTIVE QUEUE LATENCY

TECHNICAL FIELD

The invention relates to a scheduler for a TCP/IP based data communication system comprising a TCP/IP transmitter and a receiving unit, UE. The scheduler is associated with a Node comprising a rate measuring device for measuring a TCP/IP data rate from the TCP/IP transmitter and a queue buffer device for buffering data segments from the TCP/IP transmitter. The scheduler is arranged to receive information from the rate measuring device regarding the TCP/IP data rate and the scheduler is arranged to communicate with the buffer device for active queue management AQM. The invention also relates to a method for such a scheduler.

BACKGROUND

The Transmission Control Protocol (TCP) is a virtual circuit protocol that is one of the core protocols of the Internet protocol suite, often simply referred to as TCP/IP. Using TCP, applications on networked hosts can create connections to one another, over which they can exchange streams of data. The protocol guarantees reliable and in-order delivery of data from sender to receiver. TCP also distinguishes data for multiple connections by concurrent applications (e.g. Web server and e-mail server) running on the same host.

TCP supports many of the Internet's most popular application protocols and resulting applications, including the World Wide Web, e-mail and Secure Shell.

In the Internet protocol suite, TCP is the intermediate layer between the Internet Protocol (IP) below it, and an application above it. Applications often need reliable pipe-like connections to each other, whereas the Internet Protocol does not provide such streams, but rather only best effort delivery (i.e. unreliable packets). TCP does the task of the transport layer in the simplified OSI model of computer networks. The other main transport-level Internet protocol is UDP.

Hence, TCP/IP is a protocol used for internet traffic for devices comprising a computer. This protocol allows for transmitting and receiving a data stream comprising a number of data segments in the form of packages. The data stream is advantageously broken up so that the segments may be sent to and from a user equipment (hereinafter called UE) with as high data transmission rate (hereinafter called the rate) as possible, i.e. with as many transmitted segments per time unit as possible. The UE intended to receive the data segments comprises a receiver for receiving the segments and for assembling the segments into a data stream corresponding to the transmitted data stream. When the UE has received a segment an acknowledgement signal, ACK, is sent back to the UE that transmitted the segment. If a segment is not acknowledged the transmitter retransmits the segment. The TCP/IP protocol includes rate control in order to avoid congestion in the network. Two different rate control phases (or control modes) exist and they are "slow start" and "congestion avoidance". A transmission always starts in slow start mode with a low rate. Then for each roundtrip time, RTT, the rate is doubled. The TCP/IP transmitter also estimates the RTT based on the time when a message is transmitted until corresponding acknowledge message is received from the TCP/IP receiver.

Two different reasons result in that the TCP/IP transmitter reduces its rate:

1) The transmitter does not receive an ACK on a transmitted segment within a roundtrip time timeout, RTO. The RTO is determined by a function based on the estimated RTT. When this RTO has expired, the transmitter restarts with the slow start mode.
2) A duplicated ACK is received a number of times, often three. A duplicate ACK is an ACK that point out the same segment number as the previous ACK pointed out. This means that the transmitter knows that the receiver did not receive the segment appointed to, in the ACK. Furthermore, the transmitter also knows that the receiver has received some later transmitted segments. Hence, the transmitter knows that the connection is still in operation but that a segment is lost. In such a case the transmitter performs a fast retransmission and reduces its transmission rate to half the current transmission rate. This handling is included in order to avoid that the transmitter restarts with the time consuming slow start mode, which is the consequence if an ACK is not received by the transmitter within the RTO i.e. if the missing segment is not retransmitted and acknowledged within the RTO.

In mobile networks, (e.g. IEEE 802.16 and 3rd Generation Partnership Project (3GPP)) a scheduler exists in order to distribute the transmission capacity fairly between different data transmission flows to different UEs in a cell over an air interface. At the same time the scheduler tries to utilize the transmission capacity in such a way so that the total transmission rate in the network, i.e. e.g. in the cell, can be maximized. Since the transmission capacity is limited in the air interface, the scheduler wants to control the rate of each transmission flow in a fair manner.

Several methods exist in order to regulate the transmission flow rate. One method is to incorporate a control-signaling interface between the mobile network and the TCP/IP transmitter side, where the network explicitly informs the transmitter what rate is acceptable for the scheduler.

Another method is that the mobile network provokes the TCP/IP protocol to reduce its rate, when needed, by discarding one segment but transmitting the following segments further to the receiver in the UE. This will result in a lost ACK and that the TCP/IP transmitter identifies that a segment is lost and that the transmitter will go into a fast retransmission mode according to item 1 above, i.e. to retransmit the lost segment and to reduce the TCP/IP rate to half the current transmission rate. This method strives to force the TCP/IP to a fast retransmission occasion instead of an RTO occasion that leads to the time-consuming slow start mode. Hence, the scheduler comprised in the mobile network can control the TCP/IP rate so that the scheduling rate control and the TCP/IP rate control interact in a good manner. This idea is adopted in a function often called Active Queue Management, AQM.

Furthermore, to establish a fast TCP/IP rate control, in order to get a high average transmission rate, it is known to minimize the round trip time. In order to minimize the RTT it is desired to minimize data latency time in the mobile network since the data latency is one parameter affecting the RTT. However, the TCP/IP protocol adjusts its rate for each received ACK. Hence, the faster an ACK is received, the faster the TCP/IP rate can increase, and the shorter RTT and latency time is necessary. This is a problem since channel performance between a base station and the UE always varies over time, especially when the UE is moving. When several UEs are connected to the cell, the channel performance is unique for each UE connection. Hence good channel performance will arise at different times for the different connections.

If then, according to the above, the permitted latency is minimized in the network in order to get a fast TCP/IP rate control the scheduler has to transmit data to an UE irrespective of whether if the momentary channel performance is good or bad. This means that the data may be transmitted on a poor channel requiring a lot of transmission capacity e.g. transmission power, and maybe a lot of retransmissions. This will have a negative impact on the scheduling gain for the network, i.e. for the total transmission rate in the network, i.e. e.g. in the cell. The problem also increases with the number of UEs in the cell since the more UEs being scheduled on bad channels; the more transmission capacity is required.

For the reasons above there exists a need for an improved scheduler that can manage the balance between TCP/IP rate using AQM and good channel performance for each UE in a cell controlled by the scheduler so that increased scheduling gain is achieved for the cell.

SUMMARY

The object of the invention is to meet the above need with a scheduler that can handle a TCP/IP data communication system so that scheduling gain is increased in a system comprising a number of user equipments. Here scheduling gain refers to the situation where a scheduler in a TCP/IP based system can control and time a number of devices so that a TCP/IP transmitter can increase its transmission rate of TCP/IP based data segments.

Hence, the invention refers to a method for scheduling a TCP/IP based system and a scheduler for controlling the system. The TCP/IP based system comprises the TCP/IP transmitter and a receiving unit. The TCP/IP transmitter may be comprised in a user equipment, UE, during upload or may be comprised in a transceiver unit in a part of a wireless network during download. Here "upload" and "download" is with reference to the UE, i.e. when the UE sends information the UE performs an upload and when the UE receives information the UE performs a download. The Node may be a base transceiver station comprising a transmitter and a receiver.

The Node comprises a rate measuring device for measuring a TCP/IP data rate from the TCP/IP transmitter and a queue buffer device for buffering data segments from the TCP/IP transmitter. The scheduler is arranged to receive information from the rate measuring device regarding the TCP/IP data rate, i.e. the number of data segments being transmitted per time unit. The scheduler is arranged to communicate with the buffer device for active queue management, AQM, according to prior art.

The invention is characterised in that the scheduler is arranged to perform the following steps:
  adapt the permitted queue latency to a minimum value when the TCP/IP transmitter is in a slow start mode and to;
  increase the permitted queue latency when the TCP/IP rate has reached a threshold value.

One advantage of the invention is that the adaptive increase of the permitted queue latency will allow for the scheduler to allocate the transmission of the segments buffered in the queue buffer device to a time period where the channel quality is good. Hence, there will be less use of transmission capacity, e.g. less lost segments and less retransmission and thus fewer periods where the TCP/IP transmitter is forced into the slow start mode, why the scheduling gain is increased.

One further advantage of the invention is that the permitted queue latency can be set to be very low during the slow start mode which will shorten the time period for the TCP/IP rate to reach a maximum value. In other words, the increase in the TCP/IP rate per time period can be increased by use of the short permitted queue latency.

The scheduler is arranged to increase the permitted queue latency until it reaches a selected maximum permitted latency time. This selected maximum permitted latency time depends on a number of factors, for example, the RTO and the number of UEs. However, the scheduler is arranged to increase the permitted queue latency with a rate low enough to avoid a round trip time out, RTO.

The scheduler is advantageously arranged to increase the permitted queue latency when, or after, the threshold value for the TCP/IP rate is reached. This threshold value corresponds to when the scheduler uses the AQM to force the TCP/IP transmitter to a fast retransmission mode. Here, the scheduler is arranged to use the AQM to control the queue buffer to drop at least one data segment, preferably the oldest segment, when the TCP/IP rate has reached its threshold value, in order to force the TCP/IP transmitter into a fast retransmission mode instead of risking a slow start mode.

The benefit of this embodiment is that the TCP/IP rate can be kept at a high level and that the scheduler continuously monitors the TCP/IP rate so that the permitted queue latency can be increased when the TCP/IP rate is high. The fast retransmission mode is an indicator of a high TCP/IP rate which is why this is a suitable trigger for increasing the permitted queue latency.

Furthermore, the monitoring of the TCP/IP rate allows for the scheduler to be arranged to reset the permitted queue latency to its minimum value if the measured TCP/IP rate is below a selected minimum rate in order to identify if the TCP/IP is in a slow start mode.

In one embodiment of the invention, the scheduler is advantageously arranged to increase the permitted queue latency stepwise when, or after, the scheduler uses the AQM to force the TCP/IP transmitter to the fast retransmission mode. However, the permitted queue latency may be increased continuously.

As mentioned above the data communication system may be a wireless network, for example, a telephone and/or data communication network, comprising an air interface between the TCP/IP transmitter and the receiving unit.

BRIEF DESCRIPTION OF DRAWINGS

The invention will below be described in connection to a number of drawings in which;

FIG. 3a schematically shows a diagram of TCP/IP rate dependent on time according to prior art for one pair of TCP/IP transmitter and UE;

FIG. 3b schematically shows a diagram of permitted queue latency dependent on time according to prior art for one pair of TCP/IP transmitter and UE;

FIG. 4a schematically shows a diagram of TCP/IP rate dependent on time according to the present invention for one pair of TCP/IP transmitter and UE;

FIG. 4b schematically shows a diagram of permitted queue latency dependent on time according to the present invention for one pair of TCP/IP transmitter and UE;

FIG. 5a schematically shows a diagram of channel quality dependent on time for a UE according to prior art;

FIG. 5b schematically shows a diagram of transmitted data from a TCP/IP transmitter dependent on time according to prior art;

FIG. 5c schematically shows a diagram of selected transmission opportunities when the maximum permitted queue latency is short according to prior art;

FIG. 6a is the same as FIG. 5a;

FIG. 6b is the same as FIG. 5b, and in which;

FIG. 6c schematically shows a diagram of selected transmission opportunities when the maximum permitted queue latency is long according to the present invention.

DETAILED DESCRIPTION

Figure 1:
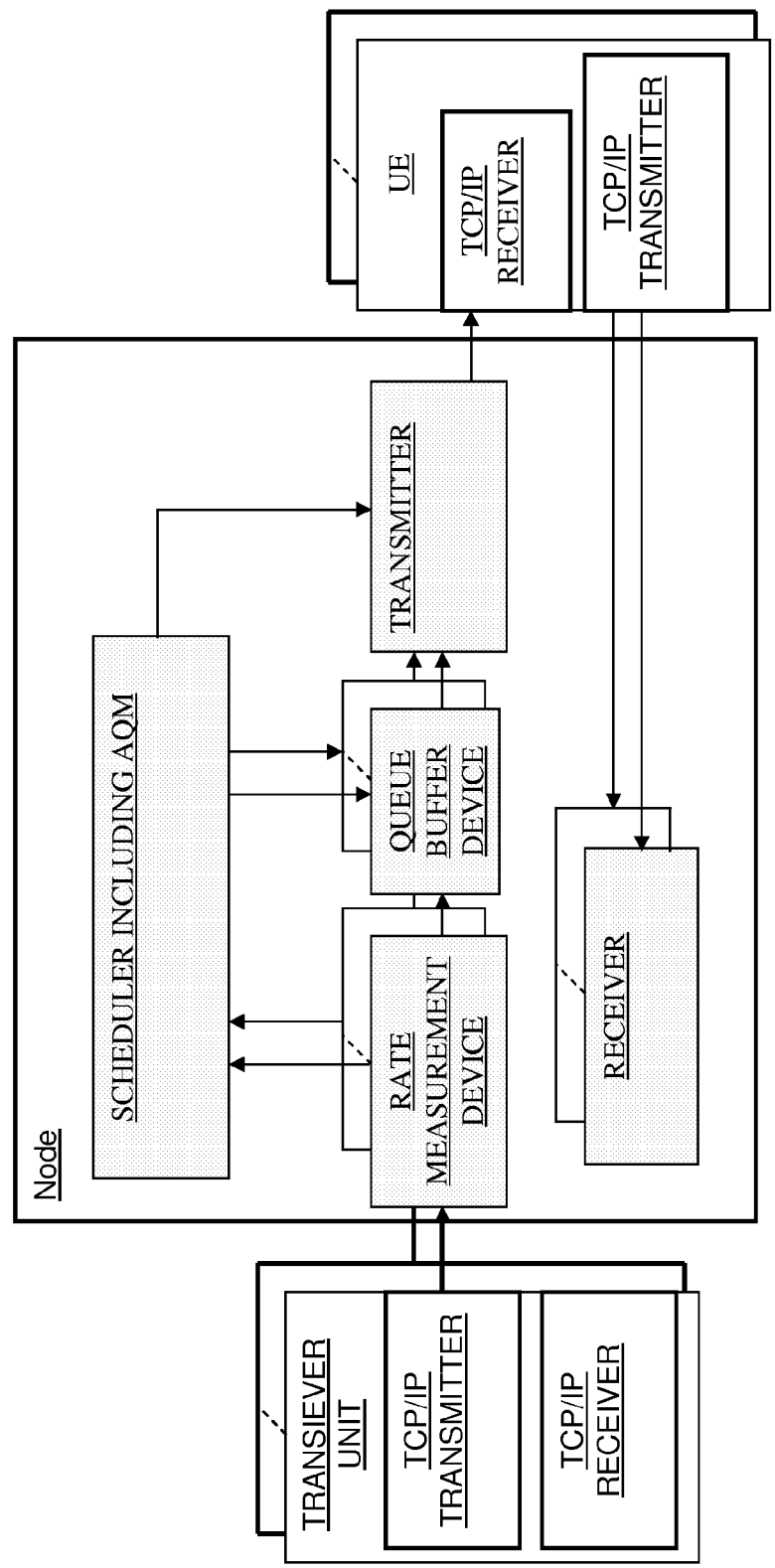
FIG. 1 schematically shows a flow chart for downlink in a TCP/IP based network comprising a scheduler according to the invention.

FIG. 1 schematically shows a flow chart for downlink in a TCP/IP based network comprising a scheduler according to the invention. In FIG. 1 a TCP/IP based system comprises a transceiver unit comprising a TCP/IP transmitter and a receiving unit in the form of a user equipment, UE, comprising a TCP/IP receiver and a Node there between.

The UE is a mobile unit in a wireless network that communicates with the transceiver unit via the Node. The UE communicates with the Node via an air interface, i.e. a wireless communication link. In GSM (Global System for Mobile Communication) and UMTS (Universal Mobile Telecommunications System) the air interface is called a radio access network and is the radio frequency portion of the circuit between the UE and the Node.

It should be noted that the transceiver unit can be a second UE or a UE fixed in a wired network or a server in a wired network or any equipment using TCP/IP for end-to-end communication, i.e. transmission and reception, of data to and from the UE. The Node can, for example, be a base transceiver station in a GSM system or a Node B in a WCDMA (Wideband Code Division Multiple Access) based system.

In a base transceiver station, latency refers to the amount of time it takes for a packet to travel from the input port to the output port of the base station. The latency in the base station contributes to the total round trip time, RTT, that a TCP/IP session observes.

The queue buffer stores a number of data packets, i.e. a number of data segments, and forwards the packets to the BTS transmitter dependent on the scheduler that controls the queue buffer. The BTS transmitter then forwards the packets to the actual UE.

The scheduler according to the invention is associated with the Node comprising a rate measuring device for measuring a TCP/IP data rate from the TCP/IP transmitter and a queue buffer device for buffering data segments from the TCP/IP transmitter. Here "associated" refers to the scheduler being comprised in the Node or that the scheduler is an external unit being connectable to the Node. The data transmission rate comprises information on momentary data rate. The rate measuring device forwards information about the data transmission rate to the scheduler.

In FIG. 1 the Node also comprises a Node transmitter for transmitting data segments from the queue buffer device to the UE and a Node receiver for receiving data segments from the UE. In FIG. 1 the UE comprises a TCP/IP transmitter for transmitting data segments to the Node and the transceiver unit comprises a TCP/IP receiver for receiving the data segments from the Node.

As mentioned above, the scheduler is arranged to receive information from the rate measuring device regarding the TCP/IP data rate. The scheduler is also arranged to communicate with the buffer device for active queue management AQM. Hence, the scheduler comprises AQM. Here, the scheduler is arranged to use the AQM to control the queue buffer to drop at least one data segment, preferably the oldest segment, when the TCP/IP rate has reached its threshold value, in order to force the TCP/IP transmitter into a fast retransmission mode instead of risking a slow start mode.

In FIG. 1 it is shown that the data communication system comprises a number of transceiver units and a corresponding number of UEs. The Node comprises a corresponding number of rate measuring devices, queue buffer devices and Node receivers. However, the Node comprises only one scheduler for scheduling all the above devices and one Node transmitter for sending the data segments to the UE. The TCP/IP communication system is an end-to-end system with one transceiver unit on one end and an UE at the other end. The data stream transmitted from the transceiver unit is thus dedicated to a certain UE at the other end and vice versa. The scheduler chooses a number of UEs to share the total transmission capacity and the scheduler then allows a number of transmitters to transmit to a number of receivers chosen by the scheduler. The transmitter may be positioned in the transceiver unit or in the UE. However, in the Node there may be only one queue per UE or several queues per UE. Consequently, in the Node at least one rate measuring device and at least one queue buffer device are thus arranged to handle the data communication between the dedicated transceiver unit and the dedicated UE. When there is more than one pair of transceiver unit and UE at least a corresponding number of rate measuring devices, queue buffers and receivers are used.

In one embodiment of the invention the data stream from the transceiver unit is not only a single data stream but may be a multiplexed signal comprising a number of data streams, dedicated for one user, having been put together into one data stream queue. The rate measuring device then measures on the data stream queue instead of on the individual data streams. This is a problem for the scheduler since it is the individual data streams that have to be acknowledged by the UE in order for the UE to use the information in the individual data streams. Hence, in this embodiment the scheduler may use the AQM to force the TCP/IP transmitter into a fast retransmission mode not by dropping a dedicated segment from the buffer, but by dropping a segment chosen based on a statistic ground. By "statistic ground" is meant that one segment is lost at a certain point in time and a second segment at another point in time and so on, so that each individual data stream in the data stream queue has dropped a segment so that the TCP/IP transmitter is forced into a fast retransmission for all individual data streams. Another way to realise this is to de-multiplex the data stream queue in the Node before the rate measuring device so that the there is one queue buffer device for each data stream. In this case the scheduler can drop a dedicated segment in each queue buffer according to above.

In FIG. 1 it is shown that the Node comprises only one Node transmitter arranged to transmit into a certain geographical area called a cell. The Node transmitter is arranged to transmit to one or more UEs in the cell during a scheduling interval, i.e. during that time period decided by the scheduler where a certain number UEs and transceiver units are allowed to transmit.

In the case where there are several UEs in the cell the scheduler uses information about all the UEs for deciding to which UE the transmitter shall transmit data segments stored in the corresponding buffer device. The scheduler uses a lot of parameters for deciding which UE is next in line. The parameters comprise information that can be used by the scheduler for fairness, i.e. an algorithm that controls that all UEs are being equally treated. However, one parameter comprises information on channel quality and it should be noted that the channel quality fluctuates over time (see FIGS. 5a-c and 6a-c). It is advantageous if the Node transmitter can transmit to the UE with the best channel quality in order to minimise the need of transmission capacity for the UE. According to the invention the scheduler may adapt the permitted buffer queue latency dependent on the current situation. When the TCP/IP rate is high the scheduler controls the buffer device to increase its permitted queue latency so that the scheduler can allocate transmissions to the UEs during those time periods where the UEs have good channel quality. Here "allocate" means that the scheduler may use a longer time interval within which the data segments may be transmitted. Hence, the transmission may be postponed within the time period, i.e. the latency, until the channel quality is good enough.

Furthermore, if the TCP/IP transmitter goes into a slow start mode the scheduler according to the invention is arranged to adapt the permitted queue latency in the buffer device to a minimum value. The scheduler then increases the permitted queue latency when the TCP/IP rate has reached a threshold value.

It is thus obvious that the more UEs that are scheduled with the scheduler according to the invention, the higher the scheduling gain.

Figure 2:
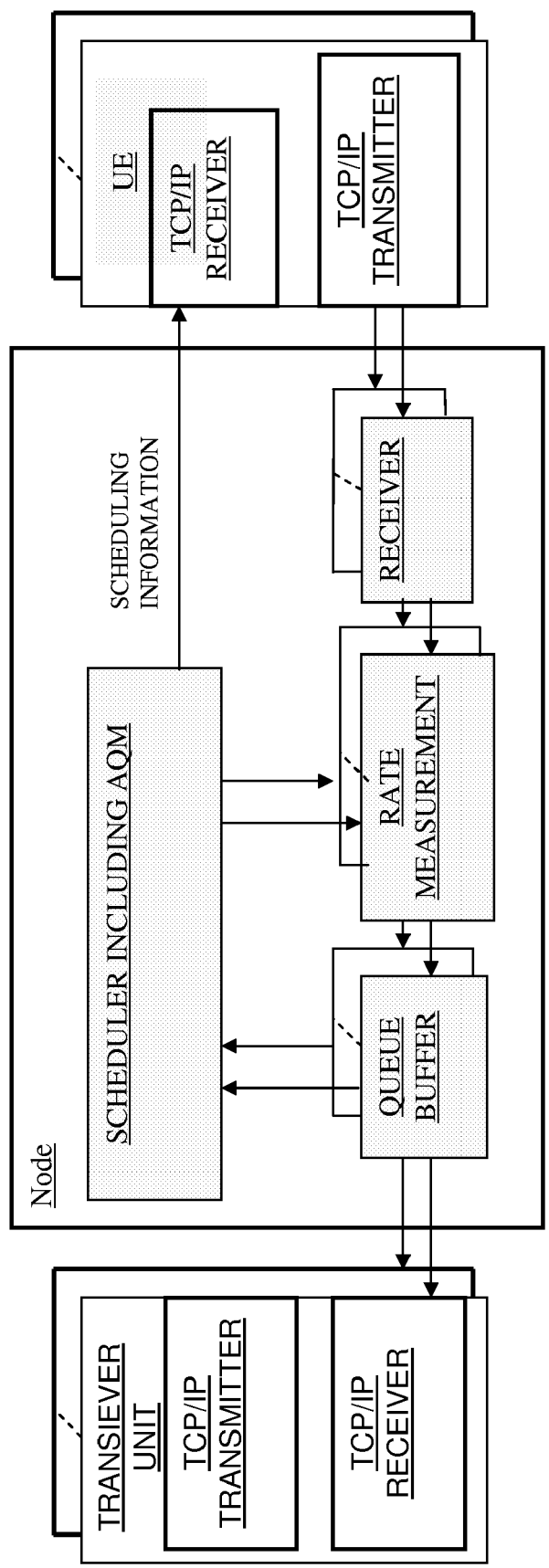
FIG. 2 schematically shows a flow chart for uplink in a TCP/IP based network comprising a scheduler according to the invention.

FIG. 2 schematically shows a flow chart for uplink in a TCP/IP based network comprising a scheduler according to the invention. FIG. 2 is essentially identical to FIG. 1 but with the exception that the UE comprises a TCP/IP transmitter for transmitting data to the transceiver via the Node. The transceiver unit is the receiving part and therefore comprises a TCP/IP receiver. Hence, in the uplink case in FIG. 2 the direction of the data stream is opposite from what is depicted in FIG. 1.

In FIG. 2 the scheduler forwards scheduling information to the UEs in order to decide which UEs that shall be permitted to transmit data. As in FIG. 1 the scheduler controls the queue buffer device to drop the oldest received segment, or any other suitable segment, that have not yet been forwarded to the TCP/IP receiver when the scheduler has detected that the TCP-IP rate is too high. As in FIG. 1 the rate measuring device measures the transmitted data rata from the TCP/IP transmitter (here in the UE), and forwards the information to the scheduler so that the scheduler can decide whether the TCP/IP rate has reached its upper threshold value. The permitted queue latency handling is equivalent to the downlink case in FIG. 1.

FIG. 3a schematically shows a diagram of TCP/IP rate dependent on time according to prior art for one pair of TCP/IP transmitter and UE according to prior art. In FIG. 3a the diagram has been divided into four time zones I-IV, by introduction of four dashed lines, in order to facilitate the description of the diagram. In the first zone I, the TCP/IP transmitter is in a slow start mode and the TCP/IP rate increases non-linearly from a TCP/IP value of $X\_min$ until a maximum value $X\_max$. The TCP/IP transmitter may be in a slow start mode for several reasons, for example if the UE roams into the cell or re-connects after being shut off or after a round trip time out, RTO, or if the transceiver unit has been shut off or has lost contact for another reason. The reason for being in a slow start mode is that a TCP/IP standard is already known from prior art and it should be noted that the above list is not exhaustive.

When the TCP/IP rate is equal to $X\_max$ the scheduler uses the AQM to force the TCP/IP transmitter into a fast retransmission mode with a TCP/IP rate being half the rate of the current rate at the time when the scheduler forced the TCP/IP transmitter into the fast retransmission mode. In FIG. 3a the fast retransmission rate can be detected by the drop in TCP/IP rate in the boundary between the first zone I and the second zone II. In the second, third and fourth Zone II-IV the TCP/IP increases from the half the rate to $X\_max$ until the scheduler forces the TCP/IP transmitter into a fast retransmission.

In FIG. 3a is depicted a long term mean TCP/IP rate being of the value X1. The low permitted queue latency in FIG. 3b results in a fast TCP/IP rate ramp up but the long term average data X_1 rate in FIG. 3a is quite low since the scheduling gain is limited. This low long term average data rate is a result of the behaviour described in FIGS. 5a,5b and 5c below.

FIG. 3b schematically shows a diagram of permitted queue latency dependent on time according to prior art. In FIG. 3b it is shown that the permitted queue latency is constant and independent of the different modes described in FIG. 3a.

FIG. 4a schematically shows a diagram of TCP/IP rate dependent on time according to the invention for one pair of TCP/IP transmitter and UE. In FIG. 4a the diagram has been divided into four time zones I-IV, by introduction of four dashed lines, in order to facilitate the description of the diagram. The four zones I-IV in FIG. 4a corresponds to the four zones in FIG. 3a. In the first zone I the TCP/IP transmitter is in a slow start mode and the TCP/IP rate increases non-linearly from a TCP/IP value of $X\_min$ until a maximum value $X\_max$. The TCP/IP transmitter may be in a slow start mode because of the reasons described in connection to FIG. 3a.

When the TCP/IP rate is equal to $X\_max$ the scheduler uses the AQM to force the TCP/IP transmitter into a fast retransmission mode with a TCP/IP rate being half the rate of the current rate at the time when the scheduler forced the TCP/IP transmitter into the fast retransmission mode. In FIG. 4a the fast retransmission rate can be detected by the drop in TCP/IP rate in the boundary between the first zone I and the second zone II. In the second, third and fourth zone II-IV the TCP/IP increases from half the rate to $X\_max$ until the scheduler forces the TCP/IP transmitter into a fast retransmission.

In FIG. 4a is depicted a mean TCP/IP rate being of the value X2. The value X2 is higher than the value X1 in FIG. 1 because of the scheduling gain due to the present invention where the permitted queue latency is adaptive. Since the permitted queue latency is adaptive the TCP/IP maximum rate $X\_max$ may be higher than in prior art. The invention will be further explained in connection to FIG. 4b.

FIG. 4b schematically shows a diagram of permitted queue latency dependent on time according to the invention. FIG. 4b shows that the scheduler may control the buffer device so that the permitted queue latency is adaptive with regard to the TCP/IP rate and the mode of the TCP/IP transmitter. In FIG. 4b the permitted queue latency can be set to a value being LATENCY_MIN when the TCP/IP transmitter is in the slow start mode in zone I. The LATENCY_MIN may be set to a lower value than the constant permitted queue latency in FIG. 3b since the present invention allows for the permitted queue latency to be increased. In prior art the constant permitted queue latency has to be set by to a value being dependent on a trade off between being too long during the slow start mode and too short when the TCP/IP is up and running in its normal pace. When the TCP/IP transmitter is in a slow start mode it is advantageous to use as short permitted queue latency as possible because the shorter the latency the higher the increase in TCP/IP rate. However, when the latency is short it consumes a lot of transmission capacity. However, when the TCP/IP has reached its maximum value $X\_max$ the need of short RTT is gone and the permitted queue latency can be increased.

For this reason the inventive scheduler increases the permitted queue latency when the TCP/IP transmitter is forced into a fast retransmission. In FIGS. 4a and 4b this event occurs in the transition between the first zone I and the second zone II, and in the transition between the second zone II and the third zone III, and in the transition between the third zone III and the fourth zone II.

The permitted queue latency may be increased stepwise in the transition between the different zones, i.e. on or after the TCP/IP transmitter is forced into a fast retransmission, as depicted in FIG. 4b, but may be increased linearly in the different zones or may be increased stepwise in the zones. The increase in TCP/IP rate in FIG. 4a is linear in the second, third and forth zones II-IV, but the increase in TCP/IP may be stepwise or non-linear dependent on the increase of the permitted queue latency.

FIG. 5a schematically shows a diagram of channel quality dependent on time for a UE according to prior art. In FIG. 5a it is shown that the channel quality changes with time.

FIG. 5b schematically shows a diagram of transmitted data from a TCP/IP transmitter dependent on time according to prior art. In FIG. 5a the data segments are labelled D1-D9. The data segments D1-D9 are stored in the queue buffer device in the Node and the scheduler has to control each queue buffer device and the Node transmitter to transmit to the different UEs in the cell. In FIG. 5b is shown that the permitted queue latency is set to a value corresponding to the constant value in FIG. 3b.

FIG. 5c schematically shows a diagram of selected transmission opportunities when the maximum permitted queue latency is short according to prior art. The permitted queue latency in FIGS. 5b and 5c is so short that the scheduler cannot wait for a good channel quality when scheduling the Node transmitter to send the buffered segments to the dedicated UE. Hence, for example, the segments D1, D5 and D6 have to be transmitted even though the channel quality is poor. This action uses lot of transmission capacity and there is a risk for numerous retransmissions that may end up with a slow start mode.

FIG. 6a is the same as FIG. 5a and FIG. 6b is the same as FIG. 5b. However in FIG. 6b it is shown that the permitted queue latency is increased compared to in FIG. 5b.

FIG. 6c schematically shows a diagram of selected transmission opportunities when the permitted queue latency is increased, i.e. longer than in prior art. The scheduler may use the longer permitted queue latency for allocating the transmission of the segments D1-D4 and D5-D9 respectively when there is good channel quality. The need for transmission capacity is thus reduced compared to prior art. The scheduler uses the values from the rate measurement device to control the TCP/IP rate by use of the AQM to keep the TCP/IP oscillating about the TCP/IP mean value X_2 in FIG. 4a, i.e. oscillating between the value of X-max and half the X_max.

To sum up the invention the scheduler according to the invention selects the queue buffer device, or the queue buffer devices, that shall be used for transmitting data in the current scheduling interval based on channel performance for each UE and for allowed permitted queue latency for each queue. However, other mechanisms may also affect the queue selection decision for the scheduler.

Furthermore, the scheduler forces the TCP/IP transmitter to a fast retransmission mode in order to allow a longer latency time for a specific queue and thereby make it possible for the scheduler to select a more favourable scheduling interval, e.g. when the channel conditions for the UE that the queue belongs to are good, for that queue within the new longer maximum latency time.

The following description of the invention valid for FIGS. 1, 2, 4 and 6.

The rate measuring device measures the momentary data rate and forwards the information to the scheduler that comprises AQM. As long as the momentary rate increase, the scheduler knows that the TCP/IP-transmitter uses the slow start mode. During this phase the data latency in the queue is minimized by the scheduler (QUEUE_LATENCY=LATENCY_MIN), i.e. the queue buffer device is scheduled as often as possible in order to raise the TCP/IP rate as fast as possible. When the scheduler determines that the TCP-IP rate is too high due to e.g. fairness, the scheduler orders the queue to drop the latest segment. This means that the scheduler forces the TCP/IP transmitter to a fast retransmission mode and that the TCP/IP rate is reduced to half the current TCP/IP rate. At the same time, the scheduler increases an internal parameter QUEUE_LATENCY to QUEUE_LATENCY=QUEUE_LATENCY+DELTA_LATENCY. The scheduler will now permit longer latency times in the buffer. Hence the scheduling gain can increase.

After the fast retransmission, the TCP/IP-transmitter will use the congestion avoidance mode, which means that the TCP/IP rate will increase essentially linearly. When the scheduler again decides that the rate is too high, the same procedure is performed again. The scheduler orders the queue to drop the oldest segment which leads to fast retransmission and that the TCP/IP rate will be reduced to half the current TCP/IP rate. The QUEUE_LATENCY will again be increased with DELTA_LATENCY that again leads to that the scheduling gain will be increased.

This increment of QUEUE_LATENCY can continue until it reaches a maximum permitted latency time. In such a case QUEUE_LATENCY is not incremented.

The QUEUE_LATENCY may be increased more often than each time a fast retransmission is provoked. In such a case the DELTA_LATENCY has reasonably to be smaller. The absolute value shall be set so that it can be ensured that the RTT estimator in the TCP/IP transmitter can follow the changes in RTT.

The RATE MEASUREMENT measure continuously the momentary TCP/IP rate. If this measurement detects that the rate is under a certain minimum rate (MIN_RATE) it means that we have detected that the TCP/IP transmitter has restarted in 'slow start mode'. There can be several reasons why the TCP/IP transmitter restarts in slow start.

When the RATE MEASUREMENT device informs the scheduler that the transmission has re-entered slow start-mode, the scheduler resets the QUEUE_LATENCY parameter to LATENCY_MIN. This leads to that the scheduler again minimizes the permitted queue latency in order to raise the TCP/IP rate as fast as possible.

One benefit of the invention is that the scheduler can wait with transmission until the channel performance to the UE is good. Such handling leads to increased scheduling gain since data is transmitted only when the channel is good. However, the higher latency will lead to higher RTT seen for the TCP/IP sender and thereby the TCP/IP rate will ramp up more slowly.

The invention minimizes the round trip time, RTT, during a slow start-phase resulting in that the TCP/IP rate increase is maximized. Then, when the TCP/IP rate have entered a congestion avoidance-phase (which is equal to that the TCP/IP rate has reached a high level), the permitted data latency in the base station can be increased for better scheduling gain.

Here "better scheduling gain" refers to the increased total data rate in a cell that can be achieved due to the fact that the probability to be able to send data over a good channel increases when the transmission opportunity can be selected over a longer time, i.e. the permitted data latency in the Node. Another prerequisite to utilize the scheduling gain is that the scheduler has several UEs to select between when it shall decide to which UE data shall be transmitted to in a specific transmission opportunity. Scheduling gain is achieved when at least one of these UEs has good channel quality One advantage of the invention is that the permitted data latency time in the queue buffer is increased smoothly which gives a round trip time, RTT, estimator in the TCP/IP transmitter that can follow the changes in RTT. This will further lead to minimized risk of a round trip time timeout, RTO, which would have led to a slow start mode due to changes in RTT.

The RTT estimator is a function in the TCP protocol that is assigned to adapt the TCP protocol to a connection with arbitrary round trip time. The timer for round trip time out (RTO) is then set as a function of the estimated round trip time.

The invention allows the possibility to combine the desire to have low latency in the TCP/IP transmitter in order to have a fast rate ramp up, with the desire to have high latency in the scheduler in order to achieve high scheduling gain. High scheduling gain results in higher total data throughput that will be a benefit for all UEs in the cell.

ABBREVIATIONS

3GPP 3rd Generation Partnership Project
ACK Acknowledgment
AQM Active Queue Management
IEEE Institute of Electrical and Electronics Engineers
IP Internet Protocol
OSI Open Systems Interconnection (the OSI Reference Model)
RTO roundtrip time timeout
RTT roundtrip time
TCP Transmission Control Protocol
UDP User Datagram Protocol
UE User Equipment, e.g. cellular telephone or wireless computer

The invention claimed is:

1. A scheduler for a TCP/IP based data communication system, comprising:
   a TCP/IP transmitter and a receiving unit (UE), wherein the scheduler is associated with a Node comprising a rate measuring device for measuring a TCP/IP data rate from the TCP/IP transmitter and a queue buffer device for buffering data segments from the TCP/IP transmitter,
   wherein the scheduler receives information from the rate measuring device regarding the TCP/IP data rate,
   wherein the scheduler communicates with the buffer device for active queue management (AQM),
   wherein the scheduler performs the following steps:
      adapt a permitted queue latency to a minimum value when the TCP/IP transmitter is in a slow start mode;
      increase the permitted queue latency when the TCP/IP rate has reached a threshold value; and
      transmit to a UE with a highest channel quality, such that transmission capacity for that UE is minimized.

2. The scheduler according to claim 1 wherein the scheduler increases the permitted queue latency (QUEUE_LATENCY) until a selected maximum permitted latency time is reached.

3. The scheduler according to claim 1, wherein the scheduler increases the permitted queue latency with a rate low enough to avoid a round trip timeout, RTO.

4. The scheduler according to claim 1, wherein the scheduler increases the permitted queue latency when, or after, the threshold value for the TCP/IP rate corresponds to when the scheduler uses the AQM to force the TCP/IP transmitter to a fast retransmission mode.

5. The scheduler according to claim 4, wherein the scheduler increases the permitted queue latency stepwise when, or after, the scheduler uses the AQM to force the TCP/IP transmitter to the fast retransmission mode.

6. The scheduler according to claim 4, wherein the scheduler controls the queue buffer device to drop at least one data segment, preferably the oldest, when the TCP/IP rate has reached its threshold value in order to force the TCP/IP transmitter to a fast retransmission mode.

7. The scheduler according to claim 1, wherein the scheduler resets the permitted queue latency to its minimum value if the measured TCP/IP rate is below a selected minimum rate in order to identify if the TCP/IP is in the slow start mode.

8. The scheduler according to claim 1, wherein the scheduler handles both uplink and downlink from a UE point of view.

9. The scheduler according to claim 1, wherein the data communication system comprises an air interface between the TCP/IP transmitter and the receiving unit.

10. The scheduler according to claim 9, wherein the communication system is a wireless telephone and/or data communication network.

11. A method for a scheduler for a TCP/IP based data communication system, comprising:
   a TCP/IP transmitter and a receiving unit (UE), wherein the scheduler is associated with a Node comprising a rate measuring device for measuring a TCP/IP data rate from the TCP/IP transmitter and a queue buffer device for buffering data segments from the TCP/IP transmitter,
   wherein the scheduler receives information from the rate measuring device regarding the TCP/IP data rate,
   wherein the scheduler communicates with the buffer device for active queue management AQM,
   wherein the scheduler performs the following steps:
      adapt a permitted queue latency to a minimum value when the TCP/IP transmitter is in a slow start mode;
      increase the permitted queue latency when the TCP/IP rate has reached a threshold value; and
      transmit to a UE with a highest channel quality, such that transmission capacity for that UE is minimized.

12. The method according to claim 11, wherein the scheduler increases the permitted queue latency (QUEUE_LATENCY) until a selected maximum permitted latency time is reached.

13. The method according to claim 12, wherein the scheduler increases the permitted queue latency with a rate low enough to avoid a round trip time out, RTO.

14. The method according to claim 11, wherein the scheduler increases the permitted queue latency when, or after, the threshold value for the TCP/IP rate corresponds to when the scheduler uses the AQM to force the TCP/IP transmitter to a fast retransmission mode.

15. The method according to claim 14, wherein the scheduler increases the permitted queue latency stepwise when, or after, the scheduler uses the AQM to force the TCP/IP transmitter to the fast retransmission mode.

16. The method according to claim 15 wherein the scheduler controls the queue buffer device to drop at least one data segment, preferably the oldest, when the TCP/IP rate has reached its threshold value in order to force the TCP/IP transmitter to a fast retransmission mode.

17. The method according to claim 11, wherein the scheduler resets the permitted queue latency to its minimum value if the measured TCP/IP rate is below a selected minimum rate in order to identify if the TCP/IP is in the slow start mode.

18. The method according to claim 11, wherein the scheduler manages both uplink and downlink from a UE point of view.

19. The method according to claim 11, wherein the data communication system comprises an air interface between the TCP/IP transmitter and the receiving unit.

20. The method according to claim 19, wherein the communication system is a wireless telephone and/or data communication network.

* * * * *

UNITED STATES PATENT AND TRADEMARK OFFICE
CERTIFICATE OF CORRECTION

PATENT NO. : 8,238,361 B2
APPLICATION NO. : 12/520021
DATED : August 7, 2012
INVENTOR(S) : Carlsson It is certified that error appears in the above-identified patent and that said Letters Patent is hereby corrected as shown below:

IN THE SPECIFICATIONS:

In Column 5, Line 14, delete "1 a" and insert -- 1a --, therefor.

In Column 7, Line 37, delete "TCP-IP" and insert -- TCP/IP --, therefor.

In Column 10, Line 8, delete "TCP-IP" and insert -- TCP/IP --, therefor.

Signed and Sealed this
Eleventh Day of December, 2012

David J. Kappos
*Director of the United States Patent and Trademark Office*